United States Patent [19]

Maher

[11] 4,164,670
[45] Aug. 14, 1979

[54] SEALED MOTOR MOUNT FOR HAND HELD DEVICE

[75] Inventor: William M. Maher, Churchville, N.Y.

[73] Assignee: General Electric Company, New York, N.Y.

[21] Appl. No.: 886,673

[22] Filed: Mar. 15, 1978

[51] Int. Cl.² .................................... H02K 7/14
[52] U.S. Cl. ............................... 310/50; 310/89
[58] Field of Search ............... 310/47, 50, 89, 91, 310/68 A, 48; 30/43.4, 45, 85, 180, 206, 210, 228, 264, 272 A, 340; 15/22

[56] References Cited
U.S. PATENT DOCUMENTS

| | | | |
|---|---|---|---|
| 3,329,880 | 7/1967 | Boyles | 310/50 X |
| 3,489,936 | 1/1970 | Boyles | 310/47 |
| 3,510,747 | 5/1970 | Petrides | 310/50 X |
| 4,016,802 | 4/1977 | O'Connell | 310/50 X |

*Primary Examiner*—Mark O. Budd
*Attorney, Agent, or Firm*—John F. Cullen; George R. Powers; Leonard J. Platt

[57] ABSTRACT

A motor assembly is provided for a blind tube mounting the tube having one open end with a tapered inner surface and an opening through the tube downstream of the end and facing the surface. A switch wiper is movably mounted in the opening. The tube may be the handle of a movable tool such as a toothbrush or vegetable peeler or the like. For driving the tool there is provided a sized motor mount that incudes a second tubular member with an outer tapered surface for telescopic mating with the tapered inner surface of the tube, the second member having an end vertical wall with a smaller sized motor secured to and cantilevered from the wall and extending into the tube. The second tubular member is an insulating plastic for an electrical barrier between the switch terminals and the motor. There is provided positioning and locating stop means between the second member and the outer tube and outwardly biased terminals on the second member are bridged by the switch wiper, the overall arrangement providing a combination whereby the motor assembly is slid into the blind tube for sealed engagement therewith in a concentric mount with both axial and radial alignment of the switch.

5 Claims, 3 Drawing Figures

SEALED MOTOR MOUNT FOR HAND HELD DEVICE

BACKGROUND OF THE INVENTION

1. Field of the Invention

The invention is directed to a form of motor assembly construction for mounting the motor and switch in a blind tube for sealing against a humid or wet section of the device whereby the motor is mounted concentrically and positioned with proper axial and radial alignment of the switch mechanism.

2. Description of the Prior Art

Present known arrangements for securing small motors in blind tubes comprise many different structural forms employing numerous parts, presenting alignment difficulties, providing difficult assembly line operations and may even use tubes that may form handles of rotary tool appliances, that are not blind tubes but have a separate extra end piece that is secured as by being screwed on. Additionally, while various seals may be used between the motor assembly and the tube, difficulties are presented in making the seal completely watertight when one end of the tube is in a humid or wet section such as the case of a toothbrush or vegetable peeler. It is known to anchor the motor in a cantilever fashion on a plate and seal it thereto. It is also known to support the motor in a groove on the plate that coacts with an annular groove on the motor or vice versa to provide a better sealing arrangment. One of the difficulties is providing an easy and simple arrangement whereby the motor may be mounted in a blind tube such as a plastic handle of a toothbrush which has only one open end and also maintaining the proper concentric alignment of the motor as well as its axial and radial alignment to insure orientation with a switch through the handle and to provide such assembly without difficult trying and fitting operations which, in an assembly line are time consuming and costly. The present invention is an improvement on the structure used to place a small motor correctly in a blind tube to provide for proper concentricity with both axial and radial alignment for orienting with a switch through the side of the tube. The structure also inherently provides a tight seal to insulate the motor and switch electrical structure from outside wetness which is always present if the device is a toothbrush or vegetable peeler or the like.

SUMMARY OF THE INVENTION

Briefly, the invention provides a motor assembly for a blind tube mount handle, the tube having only one open end with a tapered inner surface and with an opening therethrough downstream of the end and facing the surface. A switch wiper is movably mounted in the opening and a sized motor mount, preferably of insulating plastic, includes a second tubular member with an outer tapered surface for telescopic mating with the tapered inner surface and the second member has an end vertical wall. A smaller sized motor is secured to and cantilevered from the end wall to extend into the tube. Positioning and aligning stop means between the second member and the outer tube is provided so the motor can be assembled in only one position. Outwardly biased switch terminals on the insulating second member are provided to be bridged by the wiper switch, the elements of the combination being arranged whereby the motor assembly can be slid in only one position into the blind tube for inherent sealing engagement with the tube in a concentric mount and having automatic axial and radial alignment of the switch. Thus, the main object of the invention is to provide a simplified motor assembly for mounting in a blind tube whereby the motor assembly is automatically disposed concentrically with axial and radial alignment while providing a sealed motor mount assembly.

DESCRIPTION OF THE PREFERRED EMBODIMENT

While the blind tube assembly may be used in numerous applications as will be apparent, it is typically applicable to small appliances or rotary tools such as used in a vegetable peeler and will be described in connection therewith for illustration only.

Figure 1:
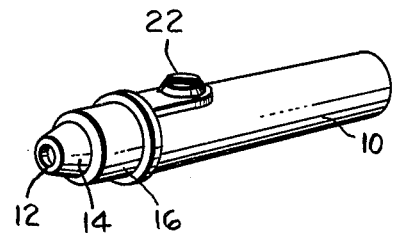
FIG. 1 is a perspective of a handle mount in a blind tube assembly for a rotating tool.
Figure 3:
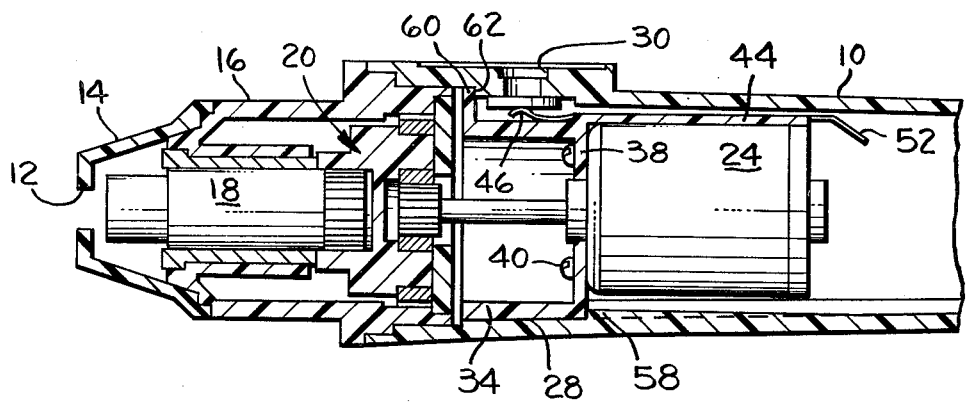
FIG. 3 is a cross-sectional view of a typical rotary tool as shown in FIGS. 1 and 2.

Referring first to FIG. 1, there is shown a rotary tool comprising an outer plastic handle 10 in the form of a blind tube in that the lower or right end is molded closed. This may contain an internal low voltage motor, such as a 12 volt motor battery or transformer driven as well known but forming no part of the invention. As such, handle 10, the case of a vegetable peeler is designed to drive a rotary tool that is chucked at 12 in a suitable plastic cone 14 secured to or forming part of an outer housing 16 containing an internal driven shaft 18 which may be driven directly from the motor or, as shown in FIG. 3, may be driven through a reducing transmission 20 at the proper speed for the particular tool. The device is energized by switch 22 all as generally known in the art.

Figure 2:
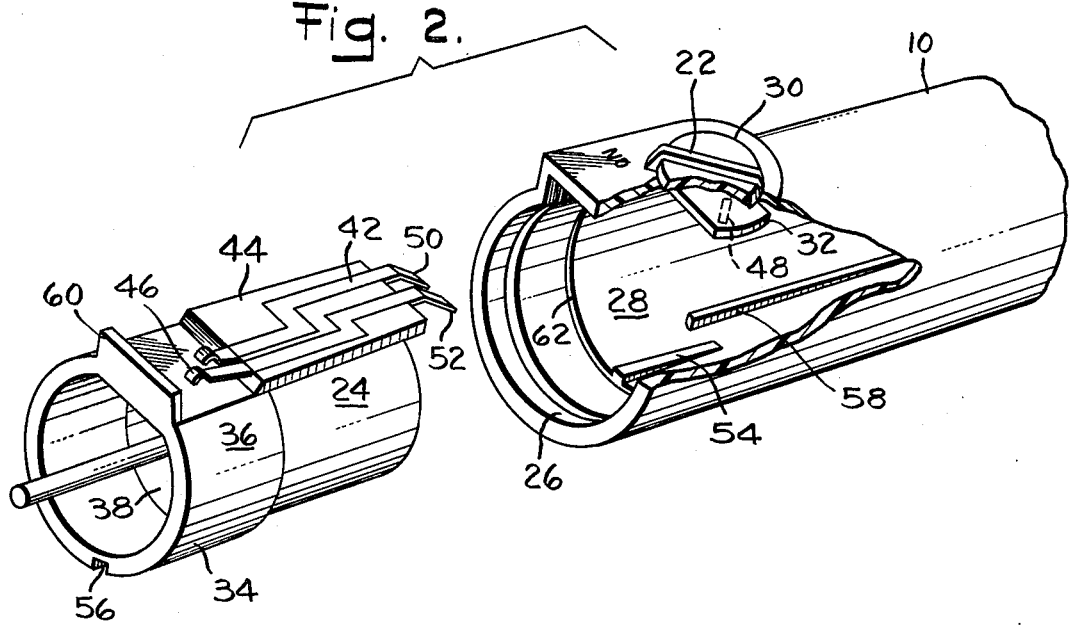
FIG. 2 is an exploded enlarged perspective of the two part motor assembly.

For driving the appropriate tool, a low voltage small motor 24 is carried in the tube handle 10 as well known. Since the device of FIG. 1 is used in a wet environment as a vegetable peeler, it is incumbent that the electrical portions be extremely well insulated even though a low voltage motor is used. Additionally, it is desired to provide an efficient assembly line arrangement whereby the motor 24 can be easily assembled outside of the tool and then pushed into the handle 10 with certainty that the parts are always aligned and sealed for proper operation of switch 22 since the handle 10 is a blind tube assembly. To this end, as shown in FIG. 2, the blind tube handle 10 has one open end 26 which end is provided with a tapered inner surface 28 and has a switch opening 30 provided downstream of the open end 26 and facing the tapered surface. For operating the motor, a switch wiper 32 is movably, and rotatably mounted in the opening such that, as shown, the switch may be turned to the "on" position of FIG. 2 or rotated counter-clockwise to a symmetrical "off" position. For carrying the internal motor, a molded insulating plastic, such as a polycarbonate, is provided as a second tubular member 34 and it is formed to have an outer tapered surface 36 for mating in a telescopic fashion with tapered inner surface 28 when member 34 is pushed into handle 10 as shown in FIG. 3. The tapered surfaces inherently provide a tight seal as well as concentric alignment of member 34 in tube 10. Securement may be obtained by coating surfaces 28 and 36 with a suitable adhesive that both seals and cements or locks the parts together. The diametrically smaller sized motor 24 is supported on member 34 on an end vertical wall 38 by suitable means such as screws 40 so that the motor is secured to and cantilevered from wall 38 to concentrically extend into tube handle 10 as shown in FIG. 3 evenly spaced from the sides of the handle. To activate the motor, a terminal structure 42 is secured to a molded extension 44 on tubular member 34, the extension being a flat downstream plastic extension like a diving board over the motor and it supports outwardly biased metallic terminals 46 well insulated for an electrical barrier from the motor as shown in FIG. 2. Terminals 46 are bridged by suitable bus 48 on the undersurface of switch wiper 32 so that, as shown, the circuit is completed and the motor actuated whereas, rotating switch 22 counterclockwise to "off" disengages the bus 48 and breaks the circuit. Any suitable movable switch can bridge terminals 46 and the rotating one shown is merely illustrative. Of course, the other end of one terminal 42 is connected to the incoming hot line at 50 with the other terminal connected through the motor at 52 or vice versa. An outward bias of terminals 46 as shown ensures good contact with bus 48 whenever they are aligned.

In order that the sub-assembly to the left of FIG. 2 may always be in proper alignment within blind tube 10, suitable positioning stop means such as the ridge 54 on the inner tapered surface 28 and slot 56 on the outer tapered surface of tubular member 34 provides correct radial or twisting alignment at all times. Additionally, depth alignment is provided by a pair of diametrically opposed stop means such as rib 58 on the inner surface of tube 10 and an upstanding ear 60 molded in member 34 and abutting an inner step portion 62 formed in tube 10. The pair of stops operate together with upper ear 60 limiting inner movement of the upper portion of the motor and lower rib 58 limiting motion diametrically opposite to provide for additional concentric mounting of the motor and adding to the tapered surface concentric effect. Further, the stop means 60 and 58 provide correct axial alignment of the terminals 46 under the switch wiper 32 with no trial and error required.

Thus, the simple motor mount provides an inherently sealed assembly that is rotatably or radially aligned in the tube by the provision of ridge and slot 54 and 56 to align terminals 46 under wiper 32 and the motor is axially aligned by rib 58 and ear 60 to axially locate terminals 46 under wiper 32 while additionally to the tapered fitting, also providing for concentricity by the diametrically opposed stop arrangement so motor 24 is evenly spaced from the inside of tube 10 while its insertion is limited by the stops. Any suitable tool not shown is disposed forward of the motor and driven by transmission 20 in conventional fashion, the transmission having a suitable sealing gasket 64 between it and member 34 if desired.

Thus, the structure provides a motor sub-assembly that can be completed outside the blind tube 10, perfectly inserted to align properly with switch opening 30 while inherently providing a sealing surface that is enhanced by supplying the tapered surfaces with an adhesive to glue together for a good water seal of the electrical portion from the movable external tool all as described.

While I have hereinbefore described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A motor assembly for a tube mount comprising,
   a tube having one open end with a tapered inner surface and an opening therethrough downstream of said end facing said surface,
   a switch wiper movably mounted in said opening,
   a sized motor mount including a second tubular member with an outer tapered surface for telescopic mating with said tapered inner surface,
   said member having an end vertical wall,
   a smaller sized motor secured to and cantilevered from said wall into said tube,
   positioning stop means between said member and tube and,
   outwardly biased terminals on said member bridged by said wiper
   whereby said motor assembly is slid into the blind tube for sealed engagement therewith in a concentric mount with axial and radial alignment of the switch.

2. Apparatus as described in claim 1 wherein said stop means includes,
   means within said tube diametrically abutting said tubular member to evenly limit insertion of said member within said tube.

3. Apparatus as described in claim 2 having ridge and slot means between said member and said tube to provide radial alignment therebetween.

4. Apparatus as described in claim 3 wherein said tubular member is a formed insulating plastic for electrical barrier between said switch terminals and said motor.

5. Apparatus as described in claim 4 wherein a movable tool means is disposed forward of said motor and said tapered surfaces are adhesive treated in order to water seal the electrical portion from the movable tool means.

* * * * *